(12) United States Patent
Williams, Jr.

(10) Patent No.: US 7,850,193 B2
(45) Date of Patent: Dec. 14, 2010

(54) QUICK RELEASE HITCH ASSEMBLY

(75) Inventor: Thomas M. Williams, Jr., Durham, NC (US)

(73) Assignee: Williams Innovations, LLC, Research Triangle Park, NC (US)

(*) Notice: Subject to any disclaimer, the term of this patent is extended or adjusted under 35 U.S.C. 154(b) by 0 days.

(21) Appl. No.: 12/687,209

(22) Filed: Jan. 14, 2010

(65) Prior Publication Data

US 2010/0117335 A1    May 13, 2010

Related U.S. Application Data

(63) Continuation of application No. 12/325,114, filed on Nov. 28, 2008, now Pat. No. 7,669,878.

(60) Provisional application No. 60/991,350, filed on Nov. 30, 2007.

(51) Int. Cl.
*B60D 1/00* (2006.01)
(52) U.S. Cl. .................................................. 280/507
(58) Field of Classification Search ............. 280/504, 280/507, 515
See application file for complete search history.

(56) References Cited

U.S. PATENT DOCUMENTS

| | | | |
|---|---|---|---|
| 2,441,430 A | 5/1948 | McCullar |
| 2,705,157 A | 3/1955 | Dail |
| 2,988,383 A | 6/1961 | Carson |
| 3,046,037 A | 7/1962 | Cain |
| 3,057,644 A | 10/1962 | Fisher |
| 3,093,395 A | 6/1963 | Boutwell |
| 3,140,881 A | 7/1964 | Antici |
| 3,169,028 A | 2/1965 | Scrivner |
| 3,169,782 A | 2/1965 | Columbus |
| 3,190,677 A | 6/1965 | Robbins |
| 3,207,530 A | 9/1965 | Paun |
| 3,243,202 A | 3/1966 | Carson |
| 3,279,825 A | 10/1966 | Boutwell |
| 3,313,558 A | 4/1967 | Wolfgang |
| 3,326,575 A | 6/1967 | Shepley |
| 3,410,577 A | 11/1968 | Luinstra |
| 3,744,819 A | 7/1973 | Cook et al. |
| 3,881,748 A | 5/1975 | Donaldson |
| 3,912,119 A | 10/1975 | Hill et al. |
| 3,912,302 A * | 10/1975 | Patterson ............. 280/477 |
| 3,929,237 A | 12/1975 | Schaedler |
| 3,934,315 A | 1/1976 | Millheiser et al. |
| 4,134,602 A | 1/1979 | Boger |
| 4,193,611 A | 3/1980 | Fisk |
| 4,265,465 A | 5/1981 | Deitrich, Sr. |
| 4,269,428 A | 5/1981 | Rexine |
| 4,298,212 A | 11/1981 | Jamison |
| 4,515,387 A | 5/1985 | Schuck |
| 4,603,878 A | 8/1986 | Smith, Jr. |
| 4,650,207 A | 3/1987 | Ackermann |
| 4,807,899 A | 2/1989 | Belcher |
| 4,861,061 A | 8/1989 | Frantz |
| 4,913,451 A | 4/1990 | Woodall |
| 4,944,525 A | 7/1990 | Landry |

(Continued)

*Primary Examiner*—Tony H. Winner
(74) *Attorney, Agent, or Firm*—Myers Bigel Sibley & Sajovec, P.A.

(57) ABSTRACT

A quick release assembly for remotely actuating operative disconnection between vehicles includes a lock bolt ejection assembly for remotely ejecting a lock bolt normally maintaining a coupling between the vehicles thereby allowing independent movement of the vehicles.

20 Claims, 6 Drawing Sheets

U.S. PATENT DOCUMENTS

| | | |
|---|---|---|
| 4,951,957 A | 8/1990 | Gullickson |
| 4,976,453 A | 12/1990 | Kaplan |
| 4,991,865 A | 2/1991 | Francisco |
| 5,009,446 A | 4/1991 | Davis |
| 5,067,742 A | 11/1991 | Relja |
| 5,188,385 A | 2/1993 | Wilson |
| 5,201,539 A | 4/1993 | Mayfield |
| 5,213,354 A | 5/1993 | Vaughn |
| 5,236,214 A | 8/1993 | Taylor |
| 5,277,447 A | 1/1994 | Blaser |
| 5,288,095 A | 2/1994 | Swindall |
| 5,322,315 A | 6/1994 | Carsten |
| 5,342,076 A | 8/1994 | Swindall |
| 5,503,423 A | 4/1996 | Roberts et al. |
| 5,547,210 A | 8/1996 | Dugger |
| 5,580,088 A | 12/1996 | Griffith |
| 5,593,171 A | 1/1997 | Shields |
| 5,636,885 A | 6/1997 | Hummel |
| 5,890,617 A | 4/1999 | Rowland et al. |
| 5,992,871 A | 11/1999 | Rowland et al. |
| 6,068,281 A | 5/2000 | Szczypski |
| 6,170,852 B1 | 1/2001 | Kimbrough |
| 6,193,260 B1 | 2/2001 | Homan et al. |
| 6,364,337 B1 | 4/2002 | Rowland et al. |
| 6,749,213 B2 | 6/2004 | Kollath et al. |
| 6,758,485 B1 | 7/2004 | Voelker et al. |
| 6,863,294 B1 | 3/2005 | Bonham |
| 6,889,994 B1 | 5/2005 | Birkenbaugh |
| 7,007,967 B2 | 3/2006 | Goettker |
| 7,097,193 B1 | 8/2006 | Sievert |
| 7,134,679 B2 | 11/2006 | Krstovic |
| 7,293,791 B1 | 11/2007 | Williams, Jr. |
| 7,338,062 B1 | 3/2008 | Violette et al. |
| 7,398,987 B2 | 7/2008 | Roe et al. |
| 7,416,206 B2 | 8/2008 | Buerkle |
| 7,425,014 B1 | 9/2008 | Palmer |
| 7,461,855 B2 | 12/2008 | Klar |
| 7,669,876 B2 | 3/2010 | Kerpash, Sr. |
| 2007/0080516 A1 | 4/2007 | Simmons |

* cited by examiner

QUICK RELEASE HITCH ASSEMBLY

RELATED APPLICATION

This application is a continuation application of U.S. patent application Ser. No. 12/325,114, filed Nov. 28, 2008, now U.S. Pat. No. 7,669,878 which claims the benefit of U.S. Provisional Application No. 60/991,350 filed Nov. 30, 2007, both of which are incorporated herein by reference in their entireties.

FIELD OF THE INVENTION

The present invention relates to hitching apparatus and, in particular to a hitch assembly for releasably interconnecting a towing vehicle with a towed vehicle.

BACKGROUND OF THE INVENTION

There are many situations wherein it is necessary to uncouple vehicles under adverse conditions. In military operations, because of concern for safety for personnel, it is undesirable to stop the vehicles and have the personnel manually uncouple the vehicles. The situations may also arise suddenly and unexpectedly, requiring immediate maneuvers inhibited by the trailed vehicle. Such conditions are experienced by a wide variety and combinations of existing towing and trailing vehicles. It would accordingly be desirable to provide a safe and effective way for quickly decoupling vehicles while in motion that can be readily incorporated on these vehicles.

SUMMARY OF THE INVENTION

The present invention provides a simplified and versatile quick release hitch for decoupling existing vehicles through retrofit without minimal modification whereby the release assembly may be directly incorporated on existing vehicles. The hitch incorporates a remotely actuated ejection lock bolt assembly for effecting decoupling.

In one aspect the present invention provides a hitch assembly mounted on a first vehicle for connection with a second vehicle including; a first coupling member for connection with the first vehicle, a second coupling member for connection with the second vehicle wherein the coupling members overlap in a coupled condition with apertures therein axially aligned, the hitch assembly being provided with a lock member slidably extending through the apertures for interconnecting the coupling members, the lock member including retaining means for normally preventing removal of said lock member in said coupled condition, control means remotely operable from one of said vehicles for moving the retaining means to a disengaged position allowing movement of the lock member, and spring means acting on said lock member to remove said lock bolt from said receiver member at said disengaged position thereby permitting independent travel of said first and second vehicles.

In another aspects, the invention provides a quick release hitch assembly for connecting a towing vehicle with a towed vehicle including a support assembly including a forwardly extending lunette for connecting with a hitch component on the towing vehicle and a rearwardly extending shank, a base assembly adapted for mounting on the towed vehicle and having a forwardly opening cavity slidably telescopically receiving said shank in a coupled condition, a cylindrical collar on said base assembly aligned with said cavity, axially aligned holes formed in said collar, said receiver assembly and said support assembly. a cylindrical lock bolt extending through said holes to couple said base assembly to said support assembly; a cross hole formed at one end of said lock bolt outwardly of said receiver member; a clip member extending through said cross hole for normally preventing removal of said lock bolt from said base assembly and said shank to maintain a coupled condition; a control cable attached to said clip member and manually actuated from the truck to remove said clip member from said lock bolt; and a compression spring retained in said collar surrounding said lock bolt and acting on another end of said lock bolt to eject said lock bolt from said receiver member upon removal of said clip member to permit independent travel of the towing vehicle with said base assembly remaining connected with the towing vehicle and said support assembly remaining connected with the towed vehicle. The hitch assembly base member may include spaced plates with said collar is mounted on one of the plates and forming slots therebetween with said plates including apertures aligned with said holes, and a safety chain having one end for attachment to the truck and another end terminating with apertured tabs retained in said slots by said lock bolt in said coupled condition, whereby ejection of said lock bolt also releases said tabs and safety chain. The hitch assembly may accommodate mounting on a bracket that normally mounts the lunette at a variable height wherein the support assembly includes a bracket for mounting said lunette at a similar height.

Accordingly, it is an object of the present invention to provide a release assembly for remotely disconnecting hitched vehicles without modification of the existing hitching components.

Another object is to provide a release assembly for quickly decoupling vehicles during transit.

A further object is to provide a quick release assembly for decouple vehicles during transit that may be incorporated into the hitching component of an existing towed vehicle.

BRIEF DESCRIPTION OF THE DRAWINGS

The above and other features and advantages of the invention will become apparent upon reading the following description, taken in conjunction with the accompanying drawings in which.

DESCRIPTION OF THE PREFERRED EMBODIMENT

Figure 1:
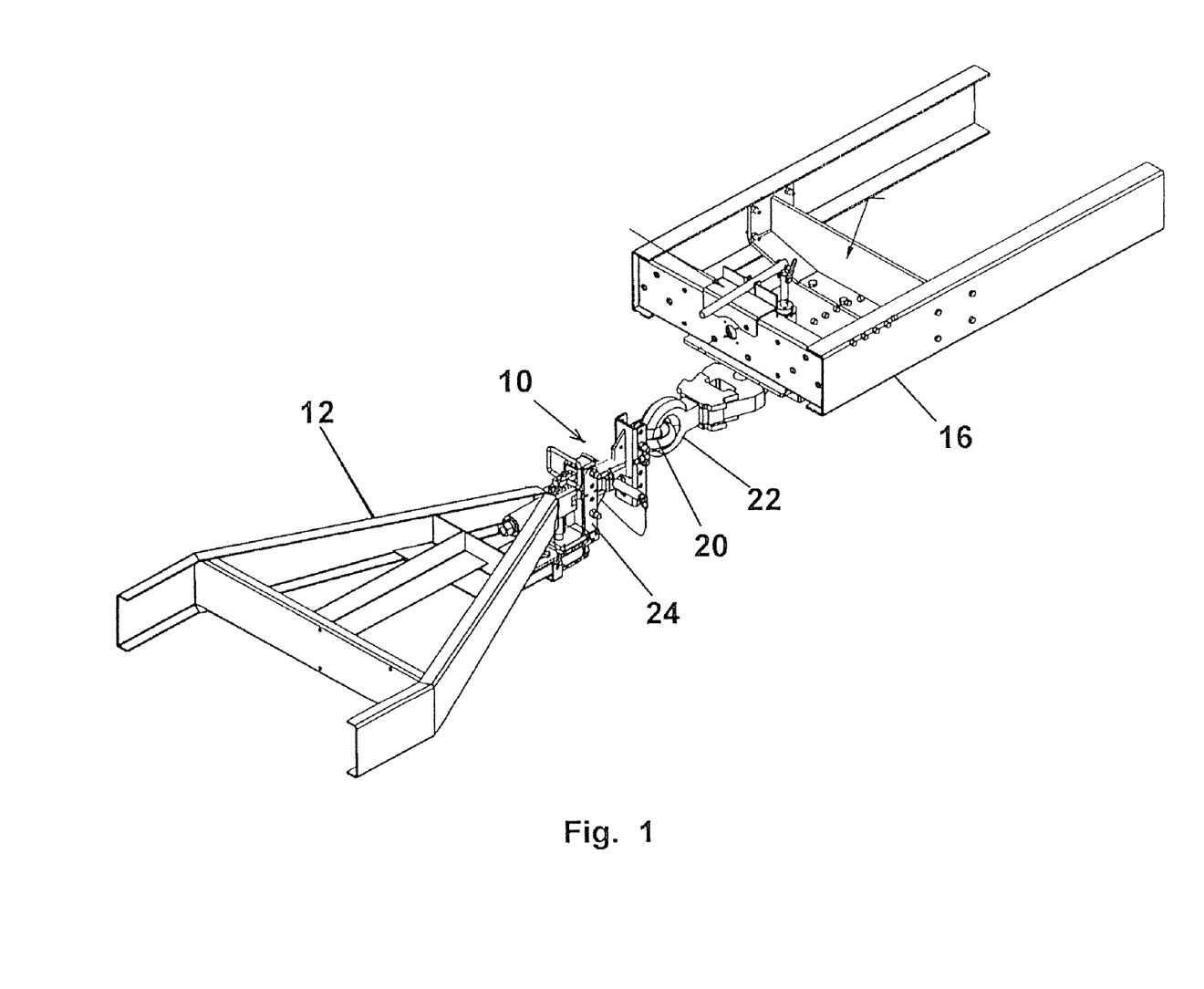
FIG. 1 is a perspective view of a quick release hitch assembly in accordance with an embodiment of the invention for connecting the tongue of a trailer to the chassis of a truck.

Referring to FIG. 1, the present invention provides a quick release hitch assembly 10 for remotely disconnecting the draw bar or tongue 12 of a towed vehicle or trailer from the rear chassis 16 of a towing vehicle or truck. The hitch assembly 10 as described below permits personnel of the towing vehicle to decouple the trailer while the vehicles are in motion in the event independent travel of the truck is necessary or desirable.

The hitch assembly 10 includes conventional hitch components such as a ring shaped lunette 20 mounted on the towed vehicle that is conventionally coupled at a lunette connector hook 22 attached at the rear of the vehicle below the chassis 16. Other conventional connector members such as a ball and socket couplers may be used. The hitch assembly may also be carried on the towing vehicle and releasably connected to the towed vehicle. The hitch assemblies of the present type are particularly adapted for heavy-duty vehicles, such as military transport systems.

The hitch assembly 10 is mounted on a bracket 24 attached to the tongue 12 of the towed vehicle 12 whereat the lunette is normally mounted. The hitch assembly 10 of the invention as described below is interposed solely in the trailer hitch component between the mounting bracket 24 and the lunette 20. The lunette may be vertically positioned at its desired former location.

Figure 2:
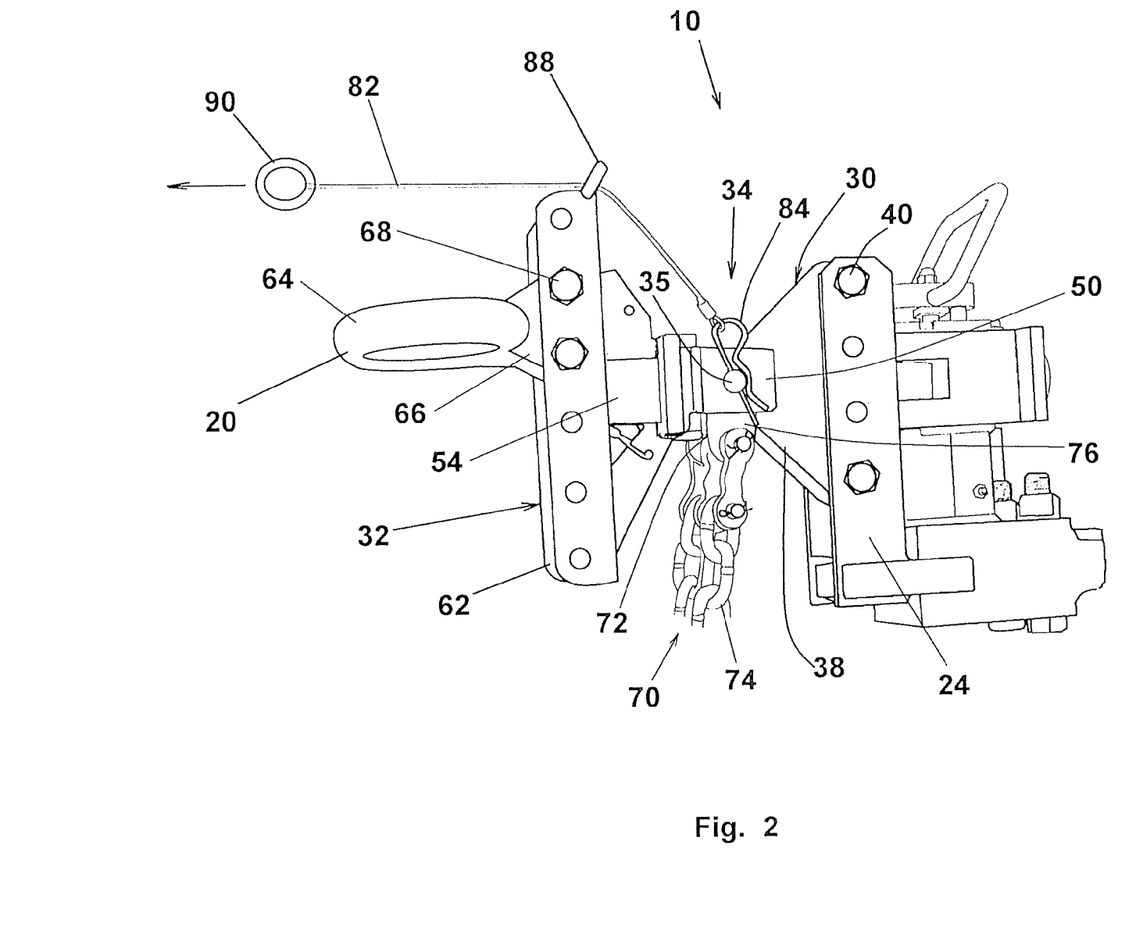
FIG. 2 is a perspective side view of the quick release hitch assembly in the coupled and locked condition.

Referring to FIG. 2, the hitch assembly 10 comprises the hitch components for interconnecting the vehicles and includes a base assembly 30 mounted on the bracket 24 having an arm assembly 32 releasably connected thereto by a releasable lock assembly 34 including a lock bolt 35. The base assembly 30 of the hitch assembly 10 includes a front receiver assembly 36 (FIG. 4) connected to a rear support base 38. The support base 38 includes a rear section that slidably fits between the arms of the mounting bracket 24. The rear section includes vertically spaced lateral through holes registering with a vertical series of through holes in the arms of the bracket 24 for attachment thereto by nut and bolt fasteners 40.

Figure 4:
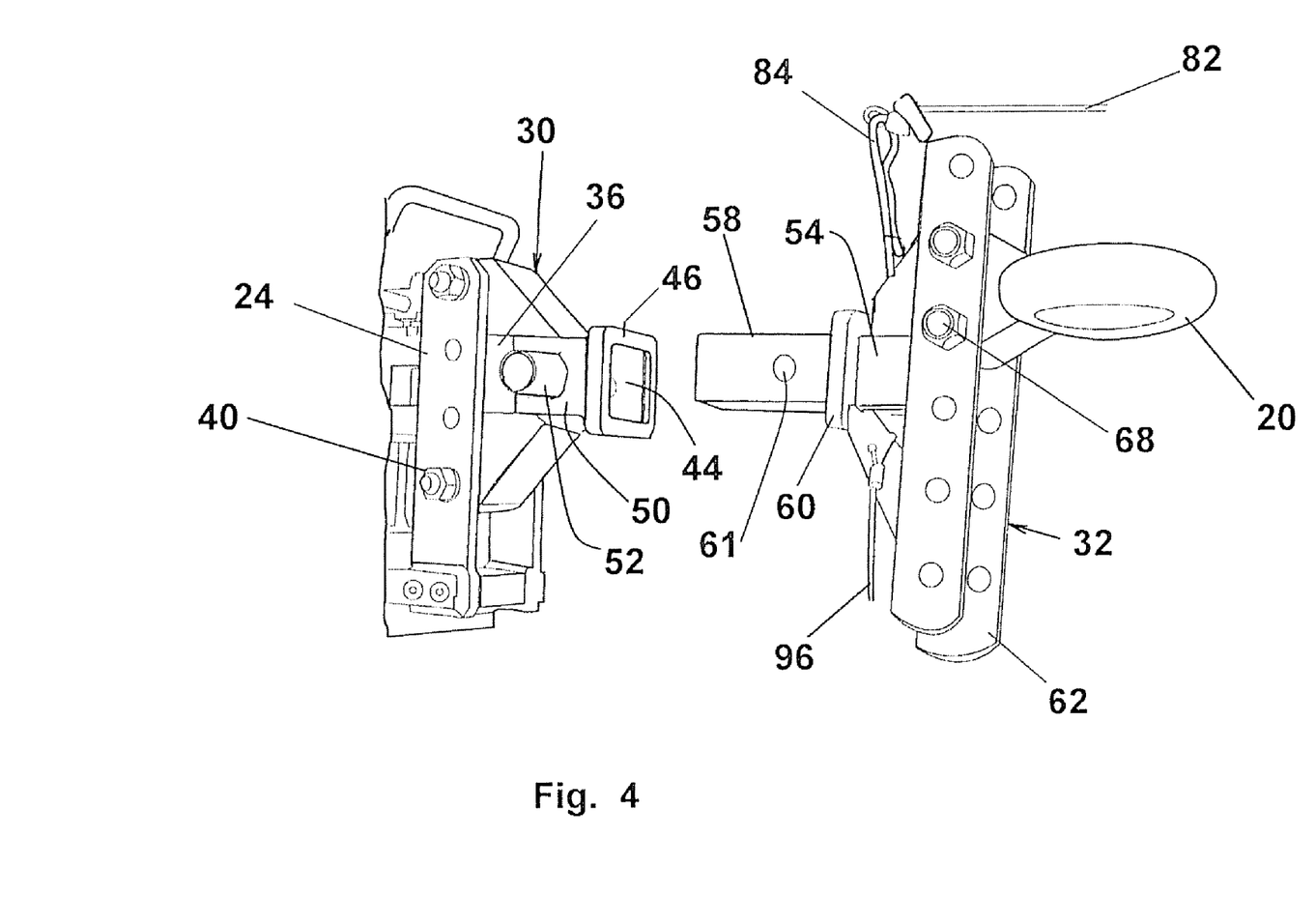
FIG. 4 is a perspective side view of the quick release hitch assembly in the uncoupled condition.

Referring to FIG. 4, the receiver assembly 36 in the base assembly 30 comprises a rectangular tubular body having a frontally opening cavity 44 of rectangular cross section frontally terminating with a rectangular peripheral flange 46. Suitable receivers are widely employed in hitching applications and commercially available. A pair of shallowly U-shaped plates 50 are attached at the sides of the receiver body and laterally outwardly spaced therefrom to form vertical slots. A cylindrical collar 52 is laterally mounted on one of the plates 50. A lateral through hole is formed through the receiver body, the plates 50 and bore of the collar 52 for receiving in assembly the lock bolt 35 of the lock assembly 34 in a coupled and locked condition as described below.

The arm assembly 32 includes a receiver assembly 54, similar to receiver assembly 36, having a rectangular tubular body that telescopically receives and supports a rearwardly extending tubular shank 58 of rectangular cross section. In the coupled condition, the shank 58 is telescopically received in the cavity 44 of the base assembly. The receiver assembly 54 includes a rectangular peripheral flange 60 that engages the flange 46 in the coupled condition. The shank 58 includes a cross hole 61, axially aligned with the holes in the receiver assembly 36 in the coupled condition, through which the lock bolt 35 extends.

Figure 3:
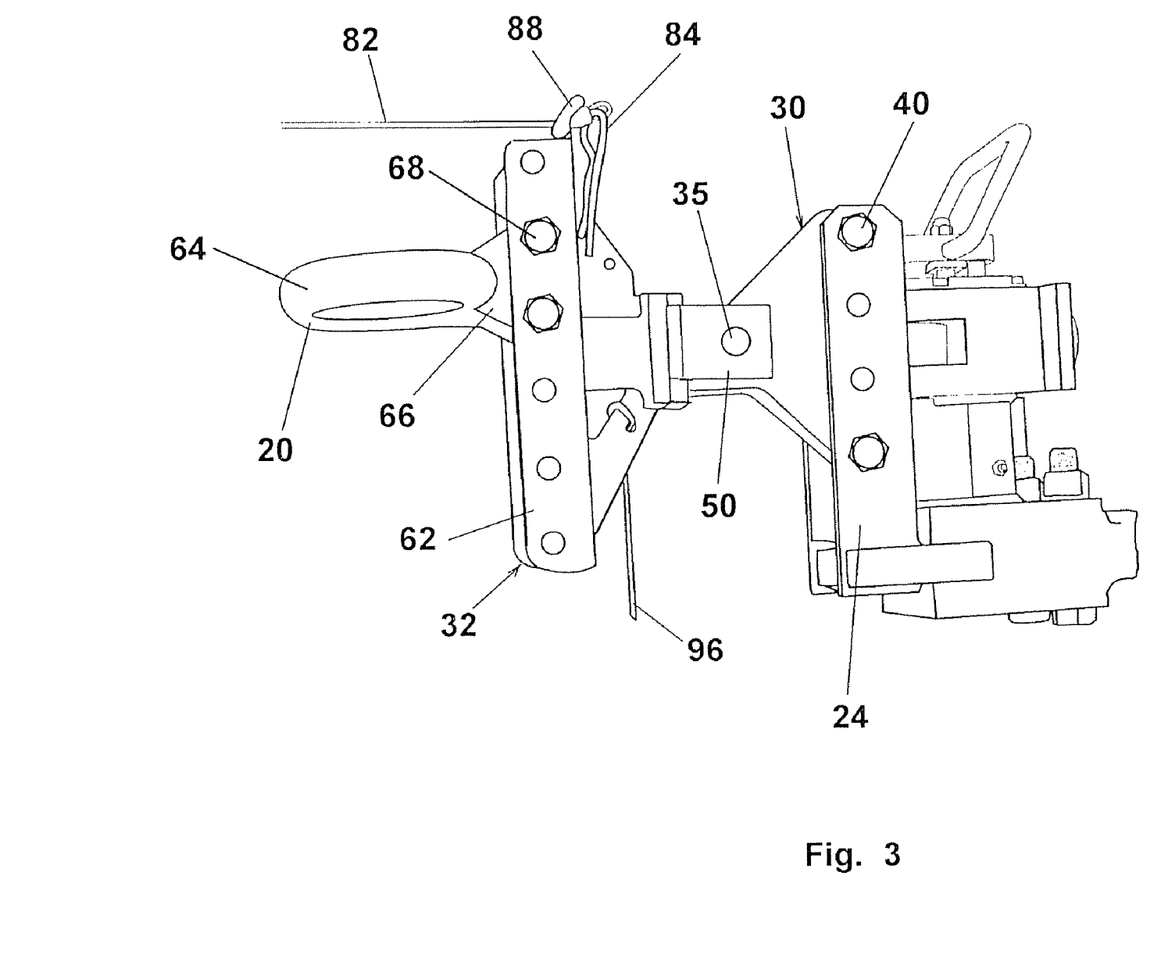
FIG. 3 is a perspective side view of the quick release hitch assembly in the coupled and unlocked condition.

Referring additionally to FIG. 3, the receiver assembly 54 is attached to a front bracket 62. The lunette 20 includes a circular coupling ring 64 and a V-shaped base 66. The base 66 includes vertically spaced lateral through holes. The front bracket 62 includes laterally spaced arms having a vertical series of aligned holes registering with the holes in the base 66 of the lunette. The holes in bracket 62 are vertically aligned with corresponding holes on the bracket 24 enabling the lunette 20 to be attached at a similar height and thereby continue to couple with varying ball heights on the towing vehicle. The lunette 20 is attached to the bracket 62 by nut and bolt fasteners 68.

As shown in FIG. 2, a safety chain 70 is releasably supported at the receiver assembly of the base assembly 20. The safety chain 70 includes a mounting bracket 72 carrying linked chains 74 terminating with hooks, not shown, for securing to the towing vehicle in a conventional manner. The mounting bracket 72 includes a laterally spaced pair of mounting tabs 76 slidably received in the slots between the plates 50. The tabs 76 are apertured and aligned with the cross holes of the plates 50 and receiver assembly 36 for releasably receiving the lock bolt 35 in the coupled and locked condition.

Figure 5:
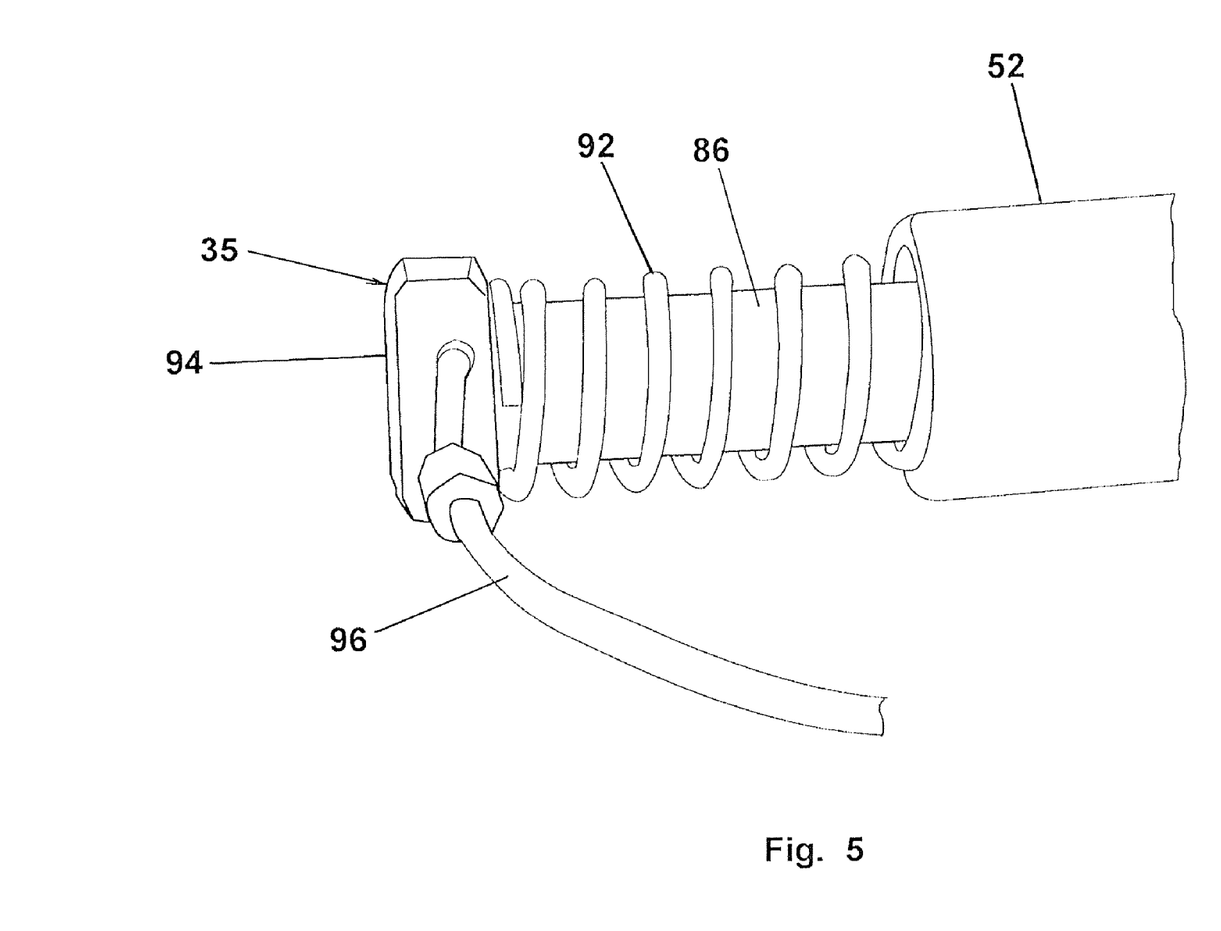
FIG. 5 is a perspective view of the lock bolt prior to locking.
Figure 6:
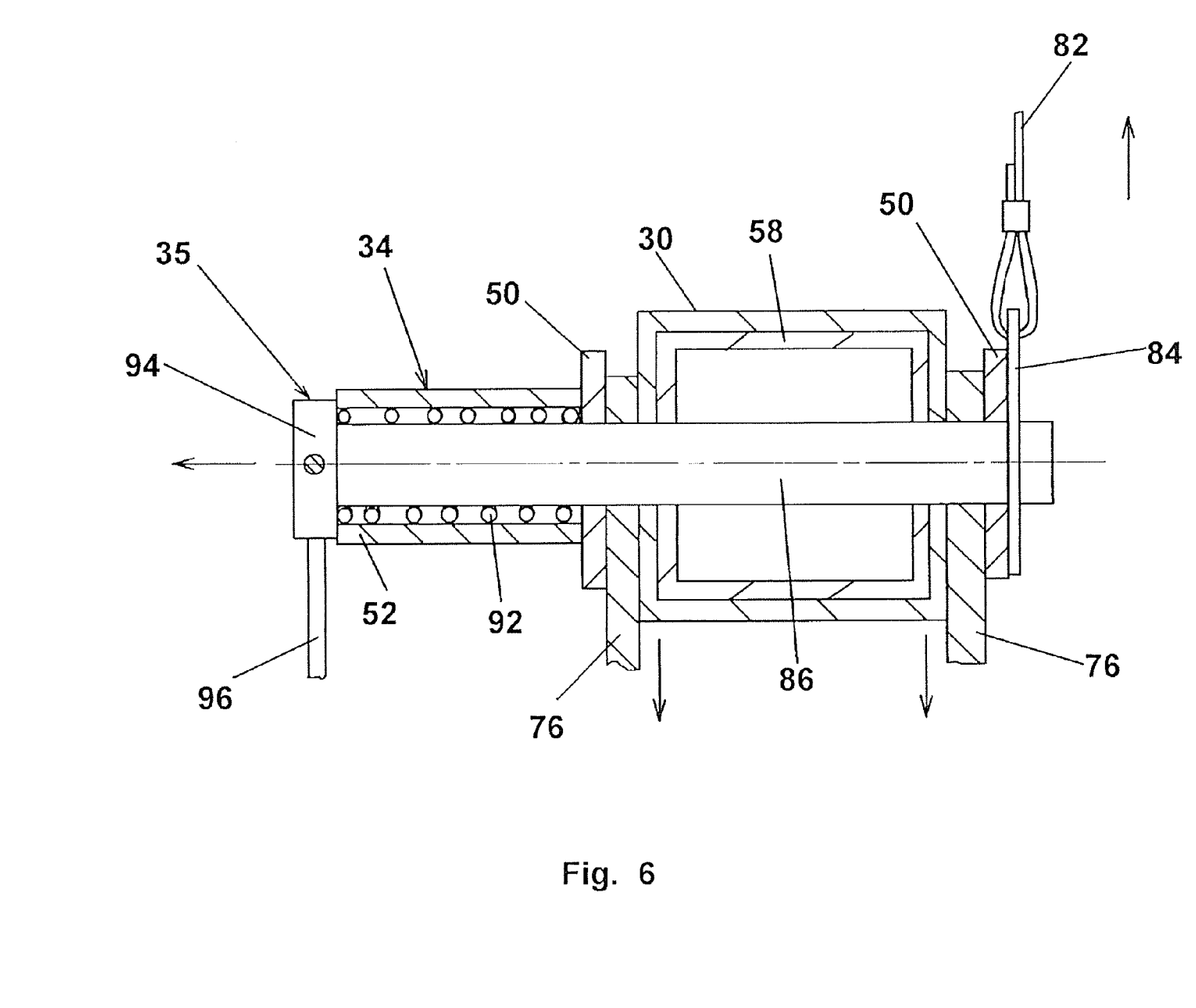
FIG. 6 is a cross sectional view of the lock bolt ejection assembly.

Referring to FIGS. 2, 5 and 6, the lock assembly 34 comprises the lock bolt 35, a control cable 82 having a rearward end loop connected a retaining spring clip 84 that extends through a cross hole on the shank 86 of the lock bolt 35. The control cable 82 is threaded through an eyelet 88 at the top of the bracket 52 and terminates at the forward end with a connector ring 90. The connector ring 90 is connected to an actuator member carried on the towing vehicle and manually controlled from the cab of the towing vehicle. The control cable may extend continuously to the actuation location. The lock bolt 35 extends through the support collar 52 on one of the support plates 50 on the receiver assembly and has a bore aligned with the cross holes. A compression spring 92 is carried in the bore of the collar 52 and surrounds the shank 86 of the lock bolt 35. The outer end of the spring 92 may be compressively or mechanically attached to the lock bolt 35 adjacent the bolt head 94 whereupon ejection both the lock bolt and the spring remain connected for recoupling. The spring 92 is compressed between the bolt head 94 and the plate 50 and the clip 84 connected thereto to establish the locked condition. A tether line 96 is connected at one end to the bolt head 94 and at the other end to the bracket 62.

In operation when it is desired to uncouple the hitch assembly, the control cable 82 is retracted from the towing vehicle thereby withdrawing the spring clip 84 from the shank 86 of the lock bolt 35. After release of the spring clip, the spring 92 laterally ejects the lock bolt 35 thereby allowing separation of the arm assembly 32 from the base assembly 30 and release of tabs 76 of the safety chain 70. The towing vehicle may then separately proceed with the arm assembly and the safety chain attached thereto. The towed vehicle may thereafter be recoupled with the towing vehicle or a similarly equipped vehicle by coupling the arm assembly to the towed vehicle base assembly, inserting the lock bolt and reattaching the spring clip.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed is:

1. A quick release hitch assembly for connecting a towing vehicle with a towed vehicle comprising:
   a support assembly including a forwardly extending hitch component for connection with a hitch component on the towing vehicle, the support assembly having a rearwardly projecting portion;
   a base assembly configured to couple with the rearwardly projecting portion;

a lock member configured to maintain the base assembly and support assembly in a coupled condition;

a retainer member removably secured to the lock member;

a control member attached to the retainer member and manually actuated from the towing vehicle to remove the retainer member from the lock member; and a spring operably connected to the lock member and configured to eject the lock member from the base assembly upon removal of the retainer member.

2. The hitch assembly of claim 1, wherein the rearwardly projecting portion comprises a shank, and wherein the base assembly comprises a forwardly opening cavity configured to receive the shank.

3. The hitch assembly of claim 2, wherein the base assembly includes a collar aligned with the cavity, and wherein the lock member extends through holes in the collar, base assembly and shank to maintain the base assembly and support assembly in the coupled condition.

4. The hitch assembly of claim 3, wherein the spring is a compression spring retained in the collar.

5. The hitch assembly of claim 1, further comprising a cross hole formed at one end of the lock member outwardly of the base assembly, and wherein the retainer member extends through the cross hole.

6. The hitch assembly of claim 3, wherein the base assembly includes spaced plates forming slots therebetween, wherein the collar is mounted on one of the plates, and wherein a safety chain having one end for attachment to the towing vehicle and another end terminating with apertured tabs is retained in the slots by the lock member, and whereby ejection of the lock member releases the tabs and safety chain.

7. The hitch assembly of claim 1, wherein the forwardly extending hitch component comprises a lunette.

8. The hitch assembly of claim 7, wherein the support assembly includes a bracket for mounting the lunette at a selected height.

9. The hitch assembly of claim 1, wherein the lock member is tethered to the base assembly for retention thereon after ejection.

10. The hitch assembly of claim 1, wherein the spring is mechanically retained on the lock member.

11. The hitch assembly of claim 1, wherein the control member comprises a cable.

12. A quick release hitch assembly for connecting; a towing vehicle with a towed vehicle comprising:

a support assembly including a forwardly extending hitch component for connection with a hitch component on the towing vehicle, the support assembly having a rearwardly projecting portion;

a base assembly configured to couple with the rearwardly projecting portion, wherein the base assembly includes spaced plates forming slots therebetween;

a lock member configured to maintain the base assembly and support assembly in a coupled condition;

a retainer member removably secured to the lock member;

a safety chain having one end for attachment to the towing vehicle and another end terminating with apertured tabs, wherein the apertured tabs are retained in the base assembly slots by the lock member; and a spring operably connected to the lock member and configured to eject the lock member from the base assembly upon removal of the retainer member, wherein ejection of the lock member releases the tabs and safety chain and allows the base assembly and support assembly to uncouple from each other.

13. The hitch assembly of claim 12, further comprising a control member attached to the retainer member and manually actuated from the towing vehicle to remove the retainer member from the lock member.

14. The hitch assembly of claim 12, wherein the rearwardly projecting portion comprises a shank, and wherein the base assembly comprises a forwardly opening cavity configured to receive the shank.

15. The hitch assembly of claim 14, wherein the base assembly includes a collar aligned with the cavity, and wherein the lock member extends through holes in the collar, base assembly and shank to maintain the base assembly and support assembly in the coupled condition.

16. The hitch assembly of claim 15, wherein the spring is a compression spring retained in the collar.

17. The hitch assembly of claim 12, further comprising a cross hole formed at one end of the lock member outwardly of the base assembly, and wherein the retainer member extends through the cross hole.

18. The hitch assembly of claim 12, wherein the forwardly extending hitch component comprises a lunette, and wherein the support assembly includes a bracket for mounting the lunette at a selected height.

19. The hitch assembly of claim 12, wherein the lock member is tethered to the base assembly for retention thereon after ejection.

20. The hitch assembly of claim 12, wherein the control member comprises a cable.

* * * * *